Aug. 9, 1966   R. A. SHAW   3,265,144
INFLATABLE FLEXIBLE STRUCTURE

Filed Aug. 10, 1964   2 Sheets-Sheet 1

Inventor
R. A. SHAW
By
Cameron, Kerkam + Sutton
Attorneys

Aug. 9, 1966 — R. A. SHAW — 3,265,144
INFLATABLE FLEXIBLE STRUCTURE
Filed Aug. 10, 1964 — 2 Sheets-Sheet 2

Inventor
R. A. SHAW
By Cameron, Kerkam & Sutton
Attorneys

United States Patent Office 3,265,144
Patented August 9, 1966

3,265,144
INFLATABLE FLEXIBLE STRUCTURE
Ronald Andrew Shaw, Boxmoor, England, assignor to National Research Development Corporation, London, England
Filed Aug. 10, 1964, Ser. No. 388,379
Claims priority, application Great Britain, Aug. 15, 1963, 32,287/63
20 Claims. (Cl. 180—7)

The invention relates to flexible structures of the kind inflatable by gas pressure to assume a desired shape.

Such structures have many applications one of which is in vehicles which in operation are supported over a surface on a cushion of pressurized gas produced beneath the vehicle and at least partly bounded by a curtain of fluid discharged from the underside of the vehicle.

Essentially such a vehicle comprises a load carrying platform and, to obtain clearance for the platform to negotiate obstructions without excessive energy requirements in maintaining a fluid curtain of greater depth than that required for normal operation, it has been proposed to provide flexible members in the form of skirts depending from the platform to contain the major portion of the cushion.

In this way, obstructions which will not pass through the fluid curtain may be surmounted by their deflecting the flexible members. However, it has been found that some flexible members do not readily recover from such deflection whilst inflated flexible members, which have also been proposed, generally acquire a degree of stiffness by virtue of their inflation which tends to prevent them deflecting readily. Contact with an obstruction in either case is likely to cause rupture of the member thus reducing its effectiveness possibly to the extent of putting the vehicle completely out of action.

The present invention is concerned with the provision of an inflatable flexible structure which will readily deflect without damage on meeting an obstruction but which can rapdily recover its initial configuration.

A flexible structure acording to the invention comprises an inflatable bag member having a separately inflatable shape defining framework, first and second valve means and sealing means so arranged that, when the framework is inflated by a relatively high pressure air supply, the first valve means connects the interior of the bag with a relatively low pressure air supply which inflates the bag to a predetermined pressure whereupon said second valve means operates to cut off the air supply to the framework.

The arrangement is such that when the bag is deflected as by an impact the sealing means is disrupted to open the bag interior to atmosphere whereupon the resultant reduction in pressure is caused to operate the second valve means so as to reinflate the shape defining framework returning the bag to shape which in turn restores the sealing means whereupon the bag is reinflated.

One embodiment of this invention will now be described by way of example with reference to the accompanying drawings, of which:

Figure 1:
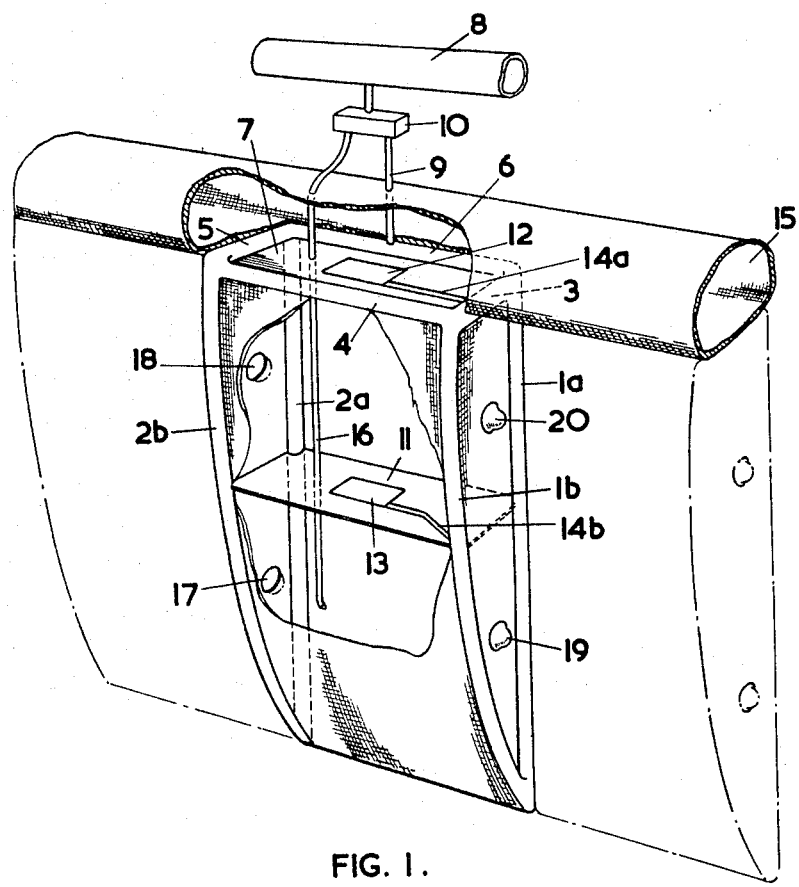
FIGURE 1 shows diagrammatically an inflatable flexible structure according to the invention.

Referring first to FIGURE 1, a flexible structure has a framework of flexible tubular members comprising spaced vertical edge members $1a$, $1b$, $2a$, $2b$ connected at their upper ends by horizontal edge members 3, 4, 5, 6. The framework is encased by vertical panels of pliant substantially impermeable material, such as stretch-resistant rubberised cloth, which form a bag-like sheath and the top is closed by a diaphragm 7 of the same material.

The framework is connected to a high pressure air supply 8 by way of a conduit 9 and valve housing 10 whereby the tubular members are inflated and the framework consequently stiffens to assume the desired outline of the structure, the surfaces of which are formed by the sheath panels. The vertical edge members are arranged in two pairs, the members of each pair being joined together at their lower ends to give a tapered profile.

The structure may be internally sub-divided into compartments by further diaphragms, one such being shown at 11.

The diaphragms 7, 11 are provided with normally closed valves 12, 13 of known type having controlling means connected to the framework tubular members (as indicated at $14a$, $14b$) in such manner that high pressure air present in the framework will cause the valves to open. A low pressure air duct 15 is arranged so that air will flow therefrom through the open valves into the interior of the flexible structure. A valve, again of known type (though not necessarily as is provided in the diaphragms), contained in valve housing 10 is biassed to the open position and has controlling means responsive to the internal pressure existing within the structure which pressure is communicated via conduit 16. The desired internal pressure, normally that necessary to maintain the shape of the structure independently of the framework, will cause the said valve to close thus cutting off high pressure air from the framework and the controlling means of the first mentioned valves 12, 13 which will return to the closed position. After the shape of the structure has been restored in this way, the stiffness of the framework is reduced by allowing any high pressure air remaining therein to leak into the main volume of the structure. This may be done in any appropriate known fashion, as for instance, by using material of slight porosity for the framework members or by a controlled leak from the controlling means for the valves of the diaphragms.

It may be arranged that the valves 12, 13, when in the closed position permit small quantities of air to pass from the low pressure duct to compensate for any slight leakage from the main volume. Alternatively, bleed holes may be provided in the diaphragms.

At least one of the side panels of the flexible structure is formed with orifices 17, 18 which are aligned with sealing means on adjacent structure (which structure may or may not be of the same type), the sealing means being arranged in such manner that internal pressure within the flexible structure will not normally be released through the orifices. One such sealing means is in the form of "dimples" 19, 20 shown protruding outwardly from the other of the side panels in such a way as to enter the orifices of a further adjacent structure of similar type, shown in chain dotted lines, and acts as plugs thereto.

Should the flexible structure be deflected relative to an adjacent structure the orifices 17, 18 become displaced in relation to the associated sealing means allowing air to escape from the flexible structure with consequent reduction of internal pressure. The stiffness of the flexible structure is thereby reduced permitting it to collapse or otherwise yield.

The reduction in internal pressure is communicated to valve housing 10 causing the valve therein to open, whereupon high pressure air is introduced into the tubing of the framework which again stiffens and, provided the cause of the deflection has been removed, rapidly restores the flexible structure to its original configuration. The orifices are once more aligned with their respective sealing means and the internal pressure of the flexible structure again builds up, closing the valve and cutting off the high pressure air to the framework.

Figure 2:
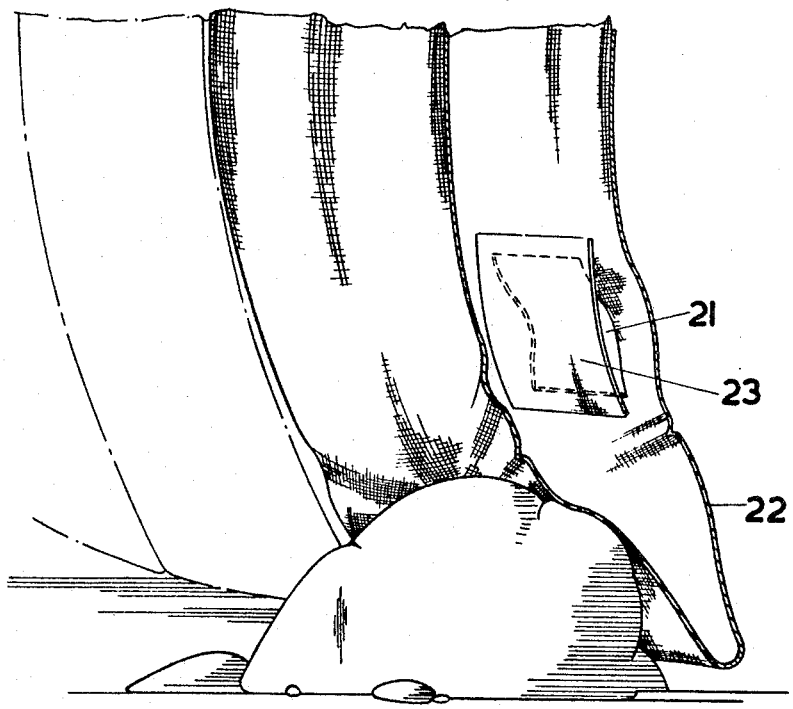
FIGURE 2 illustrates the operation of a modification to a part of the structure of FIGURE 1.
Figure 3A:
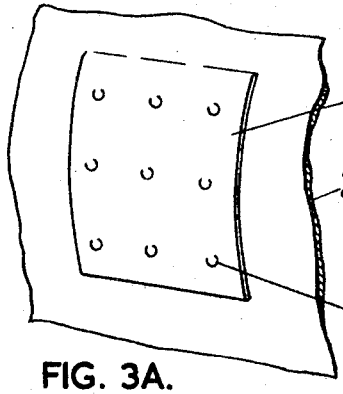
FIGURES 3A, 3B, 4A and 4B show an alternative form of the modification of FIGURE 2.

In an alternative construction, the orifices 17 and 18 and associated sealing means are replaced by an orifice 21 (FIGURE 2) formed in the rear panel 22 of a flexible structure as aforesaid and closed by a flap valve 23 hinged to the panel. The orifice might equally well be formed in the front panel or there might be one or more orifices in both front and rear panels.

The flap valve is made sufficiently stiff to maintain its shape, which conforms to the contour taken up by the panel when the structure is inflated, and is preferably hinged to the inner surface of the panel so that the internal pressure of the inflated structure will act to enhance the sealing of the closure.

In the event of deflection of the structure its panels will distort in similar manner to that shown whereupon the flap valve will no longer remain in register to close the orifice and internal pressure will be released as before. The flap valve will again close the orifice following restoration of the original contour of the panel.

The surface of the panel surrounding the flap valve may be formed with protrusions (not shown) over which the edges of the flap will ride when it becomes displaced relative to the panel thus helping break the seal. Corrugations could be used in place of the protrusions for this purpose.

Figure 4A:
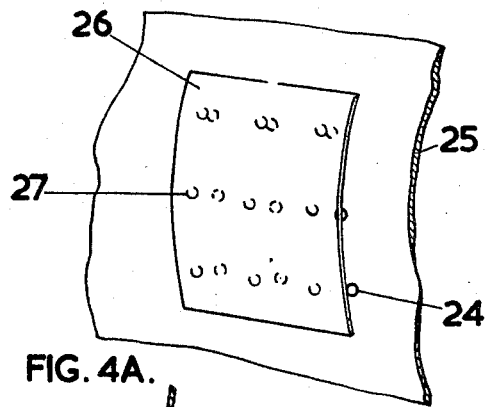
Figure 3B:
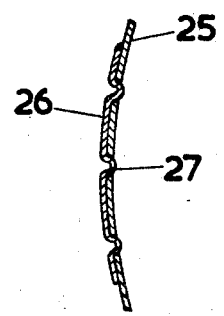
Figure 4B:
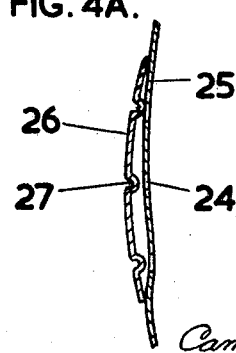

In the arrange of FIGURES 3A, 3B, 4A and 4B, a series of orifices 24 is formed in a front or rear panel 25 of an inflated flexible structure as described earlier and a stiff flap valve 26 is provided having formed on its surface a number of protrusions, or "dimples" 27, corresponding to the number of orifices. The flap valve is hinged to the panel as before and when the structure is inflated the "dimples" seal the apertures to prevent loss of internal pressure as shown in FIGURE 3B. Deflection of the structure and consequent panel distortion displaces the valve relative to the panel as previously. The "dimples" no longer remain in register with the apertures, as shown in FIGURES 4A and 4B and collapse of the structure results in similar fashion to that described earlier.

A particular application of the arrangements described is in the skirt enclosing a gas cushion in a vehicle as aforementioned. Thus the skirt might comprise a series of such flexible structures arranged adjacently. Alternatively, one or more flexible structures of the kind described might be interposed between skirt parts of a rigid or more conventionally flexible nature.

On meeting an obstruction which can not be negotiated by the normal flexibility of the skirt, the impact will cause deflection of a section or sections of flexible structure to release the contained pressure. The said sections will readily give way relieving the main structure of shock and considerably reducing the possibility of crippling damage. After passing over the obstruction the inflation of the stiffening framework rapidly restores the section to its original configuration thus serving to reduce excessive loss of cushion pressure. Thereafter, the section will be again maintained to shape by its contained pressure which is insufficient in itself to produce the necessary restoring force in the presence of the leaks deliberately created by the distortion of the surface.

In the case of a vehicle having a plenum chamber type of construction the flexible structure might be the only wall of the skirt surrounding the gas cushion. With an edge jet type vehicle there might be an inner wall of similar style, in which case the two walls could be separated by strut spacers which again could be of pressurised flexible material.

I claim:

1. A flexible structure comprising an inflatable bag member, a separately inflatable framework associated with said bag member and arranged when inflated to define therewith a desired configuration of the structure, means connecting the framework with an air supply for inflation, further means connecting the bag member with a second air supply and valve means operable by inflation of the framework so as to cause inflation of the bag member by said second air supply.

2. A flexible structure as claimed in claim 1 in which the bag member is formed with at least one aperture serving to connect the interior of the bag member to the outside atmosphere and means are provided to close said aperture when the structure is in the desired configuration.

3. A flexible structure as claimed in claim 2 in which the framework is inflated by a high pressure air supply and further comprising a second valve means operable to control the said high pressure air supply in response the pressure changes with the bag member.

4. A flexible structure as claimed in claim 3 in which the second air supply is a low pressure air supply.

5. A flexible structure as claimed in claim 4 in which the second valve means is actuated on deflation of the bag member so as to cause inflation of the framework by the high pressure air supply.

6. A flexible structure as claimed in claim 5 in which the second valve means is also actuated on inflation of the bag member to a predetermined pressure so as to isolate the framework from the high pressure air supply.

7. A flexible structure as claimed in claim 2 in which the means for closing the aperture comprises a flap valve hinged to the interior of the bag member and arranged to be maintained closed by inflation pressure within the bag member.

8. A flexible structure as claimed in claim 7 wherein the flap valve is shaped to conform to the contour assumed by that part of the bag member extending around the aperture when the structure is in its desired configuration so as to maintain the closure only while the structure retains that configuration.

9. A flexible structure as claimed in claim 8 wherein the flap valve is formed of a stiff material so as to maintain its contour and is displaced relative to the aperture by distortion of the structure from its desired configuration.

10. A flexible structure as claimed in claim 9 wherein the bag member is formed with a plurality of closely spaced apertures so disposed as to be capable of substantially simultaneous closure by a single flap valve.

11. A flexible structure as claimed in claim 10 wherein the flap valve is formed in its surface with a series of protrusions corresponding to the number of apertures which protrusions are arranged to enter into the corresponding apertures so as to close said apertures.

12. A skirt for a vehicle comprising at least one flexible structure having an inflatable bag member, a separately inflatable frame work associated with said bag member, the framework arranged when inflated to define with the bag member a desired configuration of the structure, means connecting the framework with an air supply for inflation, further means connecting the bag member with a second air supply and valve means operable by inflation of the framework so as to cause inflation of the bag member by said second air supply.

13. A skirt for a vehicle as claimed in claim 12 in which the bag member is formed with at least one aperture serving to connect the interior of the bag member to the outside atmosphere and means are provided to close said aperture when the said structure is in the desired configuration.

14. A skirt for a vehicle as claimed in claim 13 wherein the means provided to close said aperture are provided by another part of the skirt.

15. A skirt for a vehicle as claimed in claim 14 wherein a part of the skirt adjacent to the flexible structure is formed with a protrusion arranged to enter the aperture of the flexible structure to act as a plug to said aperture.

16. A skirt for a vehicle as claimed in claim 15 wherein the bag member is formed with a plurality of apertures and the adjacent part of the skirt is formed with a corresponding number of protrusions.

17. A skirt for a vehicle comprising a plurality of flexible structures each having an inflatable bag member, a separately inflatable framework associated with said bag member, the framework arranged when inflated to define with the bag member a desired configuration of the particular structure, means connecting each framework with an air supply for inflation, further means connecting each bag member with a second air supply, valve means in each structure operable by inflation of the respective framework so as to cause inflation of the respective bag member by said second air suply, each bag member being formed with at least one aperture serving to connect the interior of the bag member to the outside atmosphere, wherein means are provided to close each of said apertures when the respective structure is in the desired configuration.

18. A skirt for a vehicle as claimed in claim 17 wherein the said structures are formed with protrusions arranged to enter the apertures of adjacent structures to act as plugs to said apertures.

19. A skirt for a vehicle as claimed in claim 18 wherein distortion of any of the flexible structures displaces the associated aperture relative to the corresponding protrusion of the adjacent structure to cause deflation of the bag member.

20. A skirt for a vehicle as claimed in claim 19 in which each framework is inflated by a high pressure air supply and further comprising second valve means in each structure operable to control the high pressure air supply to each said framework in response to pressure changes within the respective bag member and to be actuated on deflation of the bag member so as to cause inflation of the framework by the high pressure air supply.

References Cited by the Examiner

UNITED STATES PATENTS 3,182,740  5/1965  Cockerell _____ 180—7

BENJAMIN HERSH, *Primary Examiner.*

M. S. SALES, *Assistant Examiner.*